(12) United States Patent
Hu et al.

(10) Patent No.: US 12,513,700 B2
(45) Date of Patent: Dec. 30, 2025

(54) TRANSMISSION BLOCK TRANSMISSION METHOD AND APPARATUS, COMMUNICATION DEVICE AND STORAGE MEDIUM

(71) Applicant: ZTE Corporation, Shenzhen (CN)

(72) Inventors: Youjun Hu, Shenzhen (CN); Bo Dai, Shenzhen (CN); Huiying Fang, Shenzhen (CN); Weiwei Yang, Shenzhen (CN); Kun Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 411 days.

(21) Appl. No.: 17/427,187

(22) PCT Filed: Feb. 3, 2020

(86) PCT No.: PCT/CN2020/074239
§ 371 (c)(1),
(2) Date: Jul. 30, 2021

(87) PCT Pub. No.: WO2020/156580
PCT Pub. Date: Aug. 6, 2020

(65) Prior Publication Data
US 2022/0132548 A1 Apr. 28, 2022

(30) Foreign Application Priority Data
Feb. 2, 2019 (CN) .......................... 201910108028.X

(51) Int. Cl.
*H04W 72/23* (2023.01)
*H04L 1/1867* (2023.01)
*H04L 5/00* (2006.01)

(52) U.S. Cl.
CPC ........... *H04W 72/23* (2023.01); *H04L 5/0053* (2013.01)

(58) Field of Classification Search
CPC ...................................................... H04L 5/0053
See application file for complete search history.

(56) References Cited

U.S. PATENT DOCUMENTS

| 2015/0009939 A1* | 1/2015 | Zhang | H04L 5/0037 370/329 |
| 2015/0049706 A1* | 2/2015 | Lee | H04L 5/0057 370/329 |

(Continued)

FOREIGN PATENT DOCUMENTS

| CN | 108631929 A | 10/2018 |
| CN | 109152072 A | 1/2019 |

(Continued)

OTHER PUBLICATIONS

International Search Report for corresponding appliction PCT/CN2020/074239 filed Feb. 3, 2020; Mail date Apr. 28, 2020.

(Continued)

*Primary Examiner* — San Htun
(74) *Attorney, Agent, or Firm* — CANTOR COLBURN LLP

(57) ABSTRACT

Provided are a transport block (TB) transmission method and apparatus, a communication device and a storage medium. The method includes acquiring downlink control information, where the downlink control information includes process scheduling indication information for indicating at least one scheduled process; and transmitting, according to the process scheduling indication information, a transport block corresponding to each scheduled process.

19 Claims, 3 Drawing Sheets

(56) References Cited

U.S. PATENT DOCUMENTS

| | | | |
|---|---|---|---|
| 2016/0021651 A1 | 1/2016 | Ko | |
| 2017/0019915 A1* | 1/2017 | Nogami | H04L 5/0053 |
| 2017/0078126 A1* | 3/2017 | Einhaus | H04L 1/0009 |
| 2017/0332365 A1* | 11/2017 | Lin | H04L 5/0053 |
| 2018/0092122 A1 | 3/2018 | Babaei | |
| 2018/0242284 A1* | 8/2018 | Beale | H04W 72/23 |
| 2018/0368110 A1* | 12/2018 | Ying | H04L 1/0075 |
| 2019/0191433 A1* | 6/2019 | Park | H04L 27/2666 |
| 2019/0254013 A1* | 8/2019 | Chang | H04L 5/00 |
| 2020/0145964 A1* | 5/2020 | Sengupta | H04L 1/0031 |
| 2020/0344031 A1* | 10/2020 | Shao | H04W 72/56 |

FOREIGN PATENT DOCUMENTS

| | | |
|---|---|---|
| CN | 110536462 A | 12/2019 |
| RU | 2559047 C2 | 4/2014 |

OTHER PUBLICATIONS

3GPP TSG RAN WG1 Meeting #95, Samsung "Scheduling of multiple transport blocks for NB-IoT", Spokane, US, Nov. 12-16, 2018, R1-1812948.

3GPP TSG RAN WG1 Meeting #94bis, ZTE, "Consideration on scheduling enhancement for MTC", Spokane, USA, Nov. 12-16, 2018, R1-1812766.

3GPP TSG RAN WG1 Meeting #94bis. ZTE, "Consideration on scheduling enhancement for NB-IoT", Spokane, USA, Nov. 12-16, 2018, R1-1812775.

Lenovo, Motorola Mobility, "Design of scheduling of multiple DL/UL TB for Rel. 16 MTC", 3GPP TSG RAN WG1 Meeting #95, Spokane, USA, Nov. 12-16, 2018, R1-1812788.

Nokia, Nokia Shanghai Bell, "Scheduling of multiple DL/UL transport blocks", 3GPP TSG RAN WG1 Meeting #95 Spokane, USA, Nov. 12-16, 2018, R1-1812905.

Russian Office Action for corresponding application 2021125813/07 (054548), dated Feb. 3, 2020; Report dated Apr. 14, 2022.

European Search Report for corresponding application EP20747759; Report dated Sep. 15, 2022.

MediaTek Inc., "Enhancements to HARQ for NR-U Operation",3GPP TSG RAN Ad-Hoc Meeting 1901, Taipei, Taiwan Jan. 21-25, 2019, R1-1900188.

\* cited by examiner

TRANSMISSION BLOCK TRANSMISSION METHOD AND APPARATUS, COMMUNICATION DEVICE AND STORAGE MEDIUM

CROSS-REFERENCES TO RELATED APPLICATIONS

This application is a national stage application filed under 35 U.S.C. 371 based on International Patent Application No. PCT/CN2020/074239, filed on Feb. 3, 2020, which claims priority to Chinese Patent Application No. 201910108028.X filed with the CNIPA on Feb. 2, 2019, the disclosures of which are incorporated herein by reference in their entireties.

TECHNICAL FIELD

The present application relates to the field of communication technologies, for example, a transport block transmission method and apparatus, a communication device and a storage medium.

BACKGROUND

In the related art, a scheduling enhancement direction is proposed in which multiple transport blocks (TBs) are scheduled using one physical downlink control channel (PDCCH) so as to be transmitted. For example, in the progress of related standards, machine-type communication (MTC) supports a maximum of eight processes when in mode A (in which one TB is scheduled in one process) and supports a maximum of four processes when in mode B. However, how to implement TB scheduling is not described in the related art and therefore is a problem that urgently needs to be solved.

SUMMARY

Embodiments of the present application provide a transport block transmission method and apparatus, a communication device and a storage medium to solve the problem of how to implement TB scheduling and transmission.

Embodiments of the present application provide a transport block transmission method. The method includes acquiring downlink control information, where the downlink control information includes process scheduling indication information for indicating at least one scheduled process; and transmitting, according to the process scheduling indication information, a transport block corresponding to each scheduled process.

Embodiments of the present application further provide a transport block transmission apparatus. The apparatus includes an information acquisition module and a transmission module.

The information acquisition module is configured to acquire downlink control information, where the downlink control information includes process scheduling indication information for indicating at least one scheduled process.

The transmission module is configured to transmit, according to the process scheduling indication information, a transport block corresponding to each scheduled process.

Embodiments of the present application further provide a communication device. The communication device includes a processor, a memory and a communication bus.

The communication bus is configured to connect the processor and the memory.

The processor is configured to execute a computer program stored in the memory to perform the steps of the preceding transport block transmission method.

Embodiments of the present application further provide a computer-readable storage medium. The storage medium stores at least one computer program. The at least one computer program is executable by at least one processor and is configured to cause the at least one processor to perform the preceding transport block (TB) transmission method.

In the transport block transmission method and apparatus, the communication device and the storage medium of embodiments of the present application, the method includes acquiring downlink control information, where the downlink control information includes process scheduling indication information for indicating at least one scheduled process; extracting the process scheduling indication information from the downlink control information; and then transmitting, according to the process scheduling indication information, a transport block corresponding to each scheduled process. The transport block transmission solutions of embodiments of the present application enable flexible scheduling of one or more (at least two) TBs, better satisfying various communication requirements.

DETAILED DESCRIPTION

To make the objects, solutions and advantages of the present application more apparent, a more detailed description is given hereinafter to illustrate embodiments of the present application in conjunction with implementations and drawings. The embodiments described herein are intended to explain the present application and not to limit the present application.

Embodiment One

Figure 1:
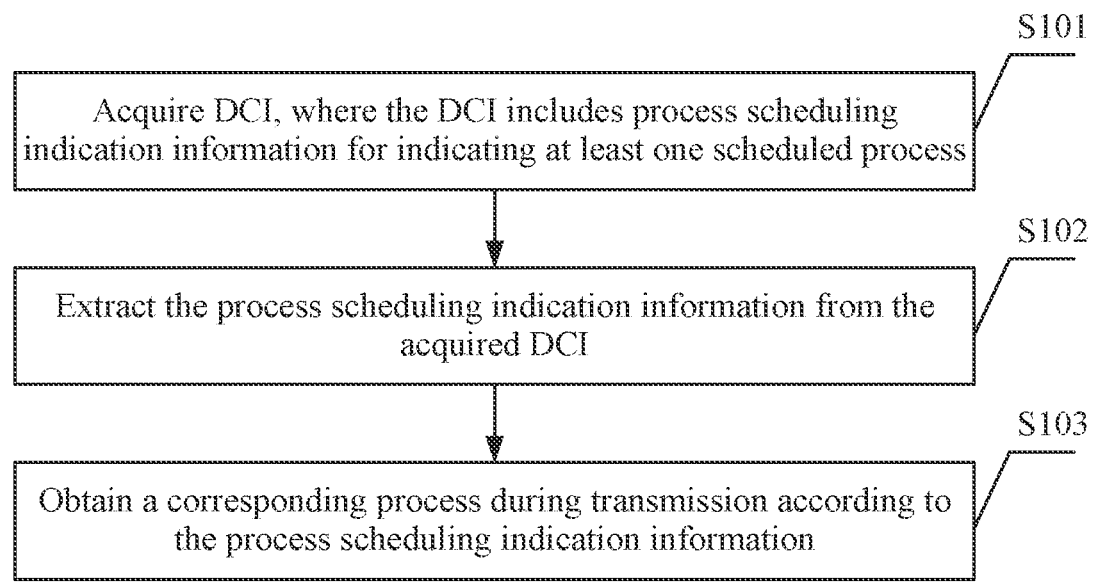
FIG. 1 is a flowchart of a transport block transmission method according to embodiment one of the present application.

This embodiment provides a method for flexible scheduling and transmission of one or more TBs. Referring to FIG. 1, the transport block (TB) transmission method includes the steps below.

In S101, downlink control information (DCI) is acquired, where the downlink control information includes process scheduling indication information for indicating at least one scheduled process.

In this embodiment, after the number of scheduled TBs is determined, downlink control information may be used to indicate scheduling. For example, in one example, the process scheduling indication information may include hybrid automatic repeat request (HARQ) process information. That is, a process in this example may be an HARQ process or may be another type of process according to certain communication environment requirements. In this example, scheduling of one process indicates scheduling of one TB, and the HARQ process information may indicate process scheduling information (for example, which processes are scheduled). However, it is to be understood that in this embodiment, the process scheduling indication information is not limited to the HARQ process information of this example and may be flexibly determined depending on application scenarios.

In this embodiment, S101 may be performed by various communication devices that may be user devices such as various communication terminals on the user side or may be communication devices on the network side such as various base station devices.

In S102, the process scheduling indication information is extracted from the acquired downlink control information.

In S103, a transport block corresponding to the scheduled process is transmitted according to the process scheduling indication information.

Additionally, it is to be understood that in this embodiment, the number of scheduled TBs, the supported transmission mode, and the transmission mode of the TBs may be flexibly set according to requirements. For example, in one example, TB scheduling may be performed in a hybrid transmission mode or a non-hybrid transmission mode. Hybrid transmission means that TBs scheduled through the DCI may include both newly transmitted TBs and retransmitted TBs. Non-hybrid transmission means that TBs scheduled through the DCI are all newly transmitted TBs or are all retransmitted TBs. Moreover, in this embodiment, the specific structure of the process scheduling indication information and the specific manner in which the process scheduling indication information indicates a scheduled process may be flexibly set. For ease of understanding, this embodiment is described below by using examples of implementation of the process scheduling indication information.

In one example of this embodiment, the process scheduling indication information includes a first method field and a first state field.

In one example, the first method field is used for indicating whether the number of currently scheduled processes is even or odd. That is, the bit value of the first method field is used for indicating whether the process scheduling mode is even-numbered process scheduling or odd-numbered process scheduling. The even-numbered process scheduling indicates scheduling an even number of processes, for example, two, four, six, eight or ten scheduled processes. The odd-numbered process scheduling indicates scheduling an odd number of processes, for example, one, three, five, seven, nine or 11 processes. In this embodiment, the first method field may occupy one or more bits according to requirements. In this example, the first state field is used for indicating a scheduled process index, that is, a currently scheduled target process.

In another example of this embodiment, the first method field is used for indicating an indication mode of the first state field, and the indication mode includes at least one of a bitmap mode or a predefined mode. Optionally, in the bitmap mode, each bit corresponds to one process, or each bit corresponds to one process group. The predefined mode may be in the form of a table or in other forms. A mapping exists between the process scheduling information in the predefined mode and the process scheduling indication information in the DCI.

Additionally, in one example of this embodiment, the first method field is used for indicating a mapping between a state of the first state field and a scheduled target process.

For example, when the current bit value of the first method field indicates an even number of scheduled processes, how many processes and which processes (that is, scheduled process indexes) are scheduled may be determined based on the current bit value of the first state field. Alternatively, when the current bit value of the first method field indicates an odd number of scheduled processes, how many processes and which processes are scheduled may be determined based on the current bit value of the first state field. In this embodiment, a scheduled process may be referred to as a target process. It is to be understood that in this embodiment, the number of bits occupied by the first state field may also be flexibly set. For example, the number of bits occupied by the first state field may be flexibly determined based on the total number of processes to be scheduled and/or possible scheduled combinations of these processes. Additionally, in this embodiment, for ease of understanding, each bit value of the first state field may be referred to as a state of the first state field, and different states of the first state field correspond to different bit values of the first state field.

Additionally, according to specific application requirements, processes to be scheduled may be numbered consecutively, and when these processes are scheduled, these processes may be scheduled in order of the process numbers so that the number of process combinations is reduced. Of course, according to requirements, processes may be scheduled not in order of process numbers.

For ease of understanding, this embodiment is described by using an example of multi-TB scheduling in the case of multi-scheduling enhancement. In this embodiment, multi-TB scheduling is implemented at a relatively small signaling overhead so that the transmission efficiency is improved. In this example, the process scheduling indication information (which may also be referred to as a multi-TB scheduling indication field) occupies X bits. Among the X bits, one bit is used for the first method field for indicating the transmission mode (even-numbered process scheduling or odd-numbered process scheduling). X=1+Y. Y bits are used for the first state field. An example structure in this case is described in Table 1.

TABLE 1

| First Method Field | First State Field |
| --- | --- |
| 0 | Indicates a corresponding even number of scheduled processes |
| 1 | Indicates a corresponding odd number of scheduled processes |

It is to be understood that in Table 1, it is also feasible to configure the first method field to use 1 to indicate odd-numbered process scheduling and configure the first method field to use 0 to indicate even-numbered process scheduling. The first method field does not necessarily use one bit to perform indication. However, the use of one bit helps reduce the signalling overhead to a relatively great extent.

In Table 1, different states (that is, different bit values) of the first state field and values of the first method field jointly indicate currently scheduled processes. In the first state field, remaining states (if any) not used for process scheduling can also be used for indicating other items according to requirements.

In this example, when process scheduling states are indicated by the first state field, the process scheduling states are indicated by the first state field according to the principles below.

Single-process scheduling (that is, one-process scheduling) and multi-TB scheduling of a maximum number of processes are ensured to be as flexible as possible.

All processes that need to be scheduled can be scheduled. Priority is given to scheduling states of a small number of processes. In this example, processes are scheduled in order of consecutive process numbers.

For ease of understanding, a description is given below in conjunction with Table 1 by using an application example in which a total of eight processes are to be scheduled. In this application example, the first method field occupies one bit. The first method field uses bit 0 to indicate even-numbered process scheduling and uses bit 1 to indicate odd-numbered process scheduling. The first state field occupies four bits and has 16 values, that is, 16 states. In this case, even-numbered process scheduling is mainly scheduling of two, four, six and eight processes. In this case, odd-numbered process scheduling is mainly scheduling of one, three, five and seven processes. For example, processes are numbered consecutively. For example, eight processes are numbered 0 to 7 corresponding to process 0, process 1, process 2, process 3, process 4, process 5, process 6 and process 7 respectively. (The same manner is used when there are more processes.) In this case, there are a total of 20 processes: eight single-process states, six three-process states, four five-process states and two seven-process states. These states are described below by way of example.

The six three-process states are the following combinations: processes 0, 1 and 2; processes 1, 2 and 3; processes 2, 3 and 4; processes 3, 4 and 5; processes 4, 5 and 6; and processes 5, 6 and 7.

The four five-process states are the following combinations: processes 0, 1, 2, 3 and 4; processes 1, 2, 3, 4 and 5; processes 2, 3, 4, 5 and 6; and processes 3, 4, 5, 6 and 7.

The two seven-process states are the following combinations: processes 0, 1, 2, 3, 4, 5 and 6 and processes 1, 2, 3, 4, 5, 6 and 7.

When there are more processes, the same manner is used, and the details are not described here.

The first state field has only 16 values, that is, 16 states; therefore, according to the principle that priority is given to scheduling states of a small number of processes, it is feasible to retain eight single-process states, six three-process states, two five-process states and one seven-process states, totally 17 states. Among these states, one state may be indicated by 00000. (Of course, which states are retained may be flexibly set according to requirements. For example, it is feasible to retain eight single-process states, six three-process states and two five-process states or retain eight single-process states, three three-process states, three five-process states and two seven-process states.) When all the preceding states need to be scheduled, it is feasible to increase the number of bits of the first state field. In this case, an example of indication by the process scheduling indication information is described in Table 2.

TABLE 2

| First Method Field | First State Field (4 Bits and 16 States) |
|---|---|
| 0 | 1111: indicates that eight processes are scheduled.<br>0001, 0010, 0100, 1000: indicate that two processes are |

TABLE 2-continued

| First Method Field | First State Field (4 Bits and 16 States) |
|---|---|
|  | scheduled.<br>0011, 1100, 1010, 0101, 0110, 1001: indicate that four processes are scheduled.<br>1110, 0111, 1101, 1011: three groups, indicate that six processes are scheduled.<br>0000 may be used for indication of odd-numbered process scheduling (for example, five scheduled processes) or may be reserved. |
| 1 | Eight single-process states;<br>Six three-process states;<br>One seven-process state; and<br>One five-process state. |

It is to be understood that when the total number of processes to be scheduled is other than eight, for example, four or 16, the first method field and the first state field may be flexibly set according to the preceding rules. The details are not described here.

In another application scenario of this embodiment, the bit value of the first method field is used for indicating whether the indication mode of the first state field is the bitmap mode or the predefined mode. For example, when the indication mode is the bitmap mode, the bitmap mode indicates that each bit corresponds to one process group that includes two or four processes; when the indication mode is the predefined mode, the predefined mode is used for indicating a single scheduled process and two scheduled processes, and scheduling states of the two processes are different from scheduling states of two processes indicated by the bitmap mode; or the predefined mode is used for indicating scheduling states of one process, three processes, five processes and seven processes. The number of the processes is flexibly determined according to practical application scenarios or requirements. The single scheduled process indicates one scheduled target process. The two scheduled processes indicate two scheduled target processes. For example, an example of the structure of process scheduling indication information is described in the Table 3.

TABLE 3

| First Method Field | Indication Mode of First State Field |
|---|---|
| 0 | Bitmap mode |
| 1 | Table mode, more specifically, a single process scheduling and two processes scheduling |

Of course, in the preceding table, the number of bits of the first method field is not limited to one. It is also feasible to use the bit value 0 to indicate the table mode and use the bit value 1 to indicate the bitmap mode. The settings may be flexibly performed according to requirements. The number of bits of the first state field may be flexibly set and is not described in detail here.

In this example, when the indication mode of the first state field is the bitmap mode and it is indicated that a process group is scheduled, all processes in the group are scheduled. For ease of understanding, a description is given by using an example of eight processes.

In this example, the eight processes are divided into four groups, and the indication mode of the first state field may be the bitmap mode that occupies four bits. The bit value 0 of the first method field indicates that the first state field uses the bitmap mode to perform indication. When a group is scheduled, two processes are both scheduled. The bit value 1 of the first method field indicates that the first state field uses the table mode to indicate scheduling a single process and scheduling two processes. In this example, single-process scheduling includes eight states and two-process scheduling includes a maximum of 28 states. Excluding the states for four two-processes in one group, it is feasible to select nine states from 24 states. One of the nine states may be indicated by full 0 (for example, 00000). Alternatively, it is feasible to select eight states from 24 states, for example, processes 0 and 2, processes 1 and 3, processes 4 and 6, processes 5 and 7, processes 3 and 5, processes 2 and 4, processes 0 and 6 and processes 1 and 7. Flexible changes may be made according to requirements.

In another example of this embodiment, the process scheduling indication information may indicate a currently scheduled target process. For example, various corresponding bit values may be used to perform indication. For example, the number of scheduled processes may include one, two, eight, and all process combinations of the one process, the two processes and the eight processes. In this embodiment, a process combination means that Y processes are scheduled from X processes. There are a total of $C_X^Y$ combinations. Each combination represents one process combination, indicating multiple currently scheduled processes.

For example, when the maximum number of scheduled processes is eight, different states may be used for indicating the number of scheduled processes including one process, two processes, three processes, four processes, five processes, six processes, seven processes or eight processes. Alternatively, different states may be used for indicating the number of scheduled processes, where the different states include all states of one process, two processes and eight processes.

Additionally, in the preceding example, each process group includes the same number of processes, but it is to be understood that each process group may be configured to include different numbers of processes according to requirements.

Embodiment Two

For ease of understanding, based on the preceding embodiment, this embodiment is described below by using an example of implementation of another process scheduling indication information. In this example, the process scheduling indication information includes a group bitmap field and an intragroup bitmap field. The group bitmap field is used for indicating a currently scheduled target process group among process groups to be scheduled. The intragroup bitmap field is used for indicating a scheduled target process in the target process group. The number of bits of the group bitmap field may be set equal to the number of process groups. The number of bits of the intragroup bitmap field may be flexibly set according to the number of processes in the group. In one example of this embodiment, the process groups may include the same number of processes and may, of course, include different numbers of processes in some application scenarios.

For ease of understanding, this embodiment is described below by way of example in conjunction with some application scenarios. The application scenario is a multi-TB scheduling scenario in the case of multi-TB scheduling enhancement. The purpose is to implement multi-TB scheduling at a relatively small signaling overhead to improve the transmission efficiency.

When the number of processes is eight, the eight processes may be divided into two groups that are indicated by six bits: bitmap two bits (that is, group bitmap field)+ intragroup bitmap four bits (that is, intragroup bitmap field). For example, the bit value 11 of the group bitmap field indicates two scheduled groups, the bit value 01 of the group bitmap field indicates one scheduled group, the bit value 10 of the group bitmap field indicates another scheduled group, and the bit value 00 of the group bitmap field indicates pending or indicates other states.

When the intragroup bitmap field occupies four bits, 1111 indicates that all processes in the group are scheduled, 1110 indicates three scheduled processes in the group, 1100 indicates two scheduled processes, 1000 indicates one scheduled process, and 0000 indicates pending or indicates other states.

In this example, in view that scheduling of a single process and scheduling of eight processes have been supported. It is feasible to use the following 19 states to indicate a relatively small number of scheduled processes: 16 states used when the bit value of the group bitmap field is 00 and three states used when the bit value of the intragroup bitmap field is 0000 and the bit value of the group bitmap field is not 00.

In this example, intergroup two scheduled processes may be indicated by 16 states used when the bit value of the group bitmap field is 00. Three states used when the bit value of the intragroup bitmap field is 0000 and the bit value of the group bitmap field is not 00 may be used for indicating intergroup three scheduled processes or may include one three-process scheduling state, one five-process scheduling state and one seven-process scheduling state.

In another application scenario of this embodiment, when the number of processes is eight, the eight processes may be divided into four groups that are indicated by six bits: bitmap four bits+intragroup bitmap two bits. The idle state may be used for indication of other states. Similarly, when the bit value of the group bitmap field is 0000, there are three states used when the bit value of the intragroup bitmap is not 00 and 16 states used when the bit value of the group bitmap field is 00. In this case, single-process, two-process and eight-process scheduling sates are all available. The remaining 19 states may be used for three-process scheduling or may be three-process, five-process and seven-process scheduling.

Similarly, for 16 processes, one bit is added and used for selection of eight processes of the 16 processes. For other numbers of processes, an adjustment may be made according to the preceding principles and is not described in detail here.

Embodiment Three

For ease of understanding, based on the preceding embodiment, this embodiment is described below by using an example of implementation of another process scheduling indication information.

In this embodiment, the maximum number of scheduled processes is four; and the process scheduling indication information includes a three-bit scheduling indication field. In this case, the scheduling indication field has eight bit values. That is, the scheduling indication field corresponds to eight states. Among the eight states of the scheduling indication field, one state is used for indicating four scheduled processes, two states are each used for indicating a combination of two scheduled processes, one state is used for indicating a combination of three scheduled processes, and four states are used for indicating four different scheduled single processes. Processes numbered 0, 1, 2 and 3 are described by way of example below. Table 4 describes one type of process scheduling indication.

TABLE 4

| Process Scheduling Indication Information | Number of Scheduled Processes | Scheduled Process (or Process Combination) |
|---|---|---|
| One state | Four scheduled processes | Processes 0, 1, 2 and 3 |
| Two states | Two scheduled processes | Processes 0 and 1 and processes 2 and 3 |
| One state | Three scheduled processes | Processes 0, 1 and 2 (or processes 1, 2 and 3; processes 0, 1 and 3; or processes 0, 2 and 3) |
| Four states | Single scheduled process | Process 0, process 1, process 2, and process 3 |

In another example of this embodiment, the maximum number of scheduled processes is four; and the process scheduling indication information includes a three-bit scheduling indication field. In this case, the scheduling indication field has eight bit values. That is, the scheduling indication field corresponds to eight states. Among the eight states of the scheduling indication field, one state is used for indicating four scheduled processes, three states are each used for indicating a combination of two scheduled processes, and four states are used for indicating four different scheduled single processes. Different states of the scheduling indication field correspond to different process combinations. Processes numbered 0, 1, 2 and 3 are described by way of example below. Table 5 describes one type of process scheduling indication.

TABLE 5

| Process Scheduling Indication Information | Number of Scheduled Processes | Scheduled Process (or Process Combination) |
|---|---|---|
| One state | Four scheduled processes | Processes 0, 1, 2 and 3 |
| Three states | Two scheduled processes | Three of processes 0 and 1; processes 2 and 3; processes 1 and 3; processes 1 and 2; processes 0 and 3; and processes 0 and 2 |
| Four states | Single scheduled process | Process 0, process 1, process 2 and process 3 |

Of course, it is to be understood that the correspondence in Tables 4 and 5 may be flexibly adjusted and the settings may be flexibly adjusted for other numbers of processes according to the preceding rules.

For example, in another example of this embodiment, when four processes are to be scheduled, the process scheduling indication information may include only a two-bit scheduling indication field. In this case, the scheduling indication field has four bit values. That is, the scheduling indication field corresponds to four states. Among the four states of the scheduling indication field, one state is used for indicating the four scheduled processes, and three states are each used for indicating a single process of the four processes. Alternatively, the four states of the scheduling indication field are used for indicating scheduling of the four processes respectively. The correspondence may be flexibly set according to requirements.

Alternatively, in another example of this embodiment, the process scheduling indication information may use a four-bit bitmap mode to indicate the four scheduled processes.

Embodiment Four

For ease of understanding, based on the preceding embodiment, this embodiment is described below by using an example of implementation of another process scheduling indication information.

In this embodiment, the process scheduling indication information may be set according to the principles below or other principles.

New-transmission and retransmission states support scheduling states of as few TBs as possible.

Newly transmitted TBs are as many as possible during hybrid transmission.

For example, in one example of this embodiment, the maximum number of scheduled processes is eight; and the process scheduling indication information includes a seven-bit scheduling indication field. In this case, the scheduling indication field has 128 bit values. That is, the scheduling indication field has 128 corresponding states. Among the 128 states of the scheduling indication field, at least one of the cases below applies.

Eight states are used for indicating eight different scheduled single processes, 28 states are each used for indicating a combination of two scheduled processes, 56 states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, and one state is used for indicating a combination of eight scheduled processes, or a remaining state is reserved or is used for indicating at least one of a combination of four scheduled processes, a combination of five scheduled processes, a combination of six scheduled processes or a combination of seven scheduled processes or used for indicating other items.

For another example, in one example of this embodiment, the maximum number of scheduled processes is eight; and the process scheduling indication information includes a six-bit scheduling indication field. In this case, the scheduling indication field has 64 bit values. That is, the scheduling indication field has 64 corresponding states. Among the 64 states of the scheduling indication field, at least one of the cases below applies.

Eight states are used for indicating eight different scheduled single processes, 28 states are each used for indicating a combination of two scheduled processes, 23 states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, or one state is used for indicating a combination of eight scheduled processes. In this case, a total of 32 states of the scheduling indication field are used.

For another example, in one example of this embodiment, the maximum number of scheduled processes is eight; and the process scheduling indication information includes a five-bit scheduling indication field. In this case, the scheduling indication field has 32 bit values. That is, the scheduling indication field has 32 corresponding states. Among the 32 states of the scheduling indication field, eight states are used for indicating eight different scheduled single processes, 16 states are each used for indicating a combination of two scheduled processes, three states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, and one state is used for indicating a combination of eight scheduled processes. In this case, a total of 32 states of the scheduling indication field are used.

It is to be understood that the correspondence and the number of bits in the preceding three examples are not limited to the values in the preceding three examples and may be flexibly set according to requirements.

In another example of this embodiment, the maximum number of scheduled processes is four, the downlink control information further includes new data indication (NDI) information, and the process scheduling indication information and the NDI information form a joint indication field.

In one example, the joint indication field occupies six bits. In this case, the scheduling indication field has 64 bit values. That is, the scheduling indication field has 64 corresponding states. Among the 64 states of the scheduling indication field, at least one of the following cases applies: 15 states are used for indicating 15 scheduled process combinations (that is, 15 states) when four processes are newly transmitted, 15 states are used for indicating 15 scheduled process combinations when the four processes are retransmitted, 28 states are used for indicating 28 scheduled process combinations when one of the four processes is retransmitted, or six states are used for indicating six scheduled process combinations when two of the four processes are retransmitted and two of the four processes are newly transmitted. For ease of understanding, a description is given below by using an example of processes in the preceding hybrid transmission. See Table 6.

TABLE 6

| Retransmitted Process | Scheduled Process Corresponding to New TB |
| --- | --- |
| Single retransmitted process, for example, process 0 (or process 1, 2 or 3) | When process 0 is retransmitted, scheduled processes corresponding to new TBs include the following seven states: process 1; process 2; process 3; processes 1, 2; processes 1 and 3; processes 2 and 3; and processes 1, 2 and 3. (In summary, there are 28 states when a single process is retransmitted.) |
| Two retransmitted processes, for example, processes 0 and 1 (or processes 0 and 2; processes 0 and 3; processes 1 and 3; processes 1 and 2; or processes 2 and 3) | When processes 0 and 1 are retransmitted, scheduled processes corresponding to new TBs include the following one state: processes 2 and 3. (In summary, there are six states when two processes are retransmitted.) |

All preceding hybrid-transmission states supporting single process and partial preceding hybrid-transmission states supporting two processes total 34 states. 15 new-transmission states of four processes and 15 retransmission states of four processes total 30 states. The 34 states and the 30 states total 64 states. The 64 states need to be indicated using six bits.

In another example of this embodiment, the maximum number of scheduled processes is four, and the joint indication field occupies five bits. In this case, the scheduling indication field has 32 bit values. That is, the scheduling indication field has 32 corresponding states. Among the 32 states of the scheduling indication field, at least one of the following cases applies: seven states are used for indicating seven scheduled process combinations when the four processes are newly transmitted, seven states are used for indicating seven scheduled process combinations when the four processes are retransmitted, 16 states are used for indicating 16 scheduled process combinations when one of the four processes is retransmitted, or two states are used for indicating two scheduled process combinations when two of the four processes are retransmitted and two of the four processes are newly transmitted. For ease of understanding, a description is given below by using an example of processes in the preceding hybrid transmission. See Table 7.

TABLE 7

| Retransmitted Process | Scheduled Process Corresponding to New TB |
| --- | --- |
| Single retransmitted process, for example, process 0 (or process 1, 2 or 3) | When process 0 is retransmitted, scheduled processes corresponding to new TBs include the following four states: processes 1, 2 and 3; processes 1 and 2; processes 2 and 3; processes 1 and 3. (In summary, there are 16 states when a single process is transmitted.) |
| Two retransmitted processes, for example, processes 0, 1 (or processes 2, 3) | When processes 0 and 1 are retransmitted, scheduled processes corresponding to new TBs include the following one state: processes 2 and 3. (In summary, there are two states when two processes are transmitted.) |

All preceding hybrid-transmission states supporting single process and partial preceding hybrid-transmission states supporting two processes total 18 states. Seven new-transmission states of four processes and seven retransmission states of four processes total 14 states. New-transmission states may be in one-to-one correspondence with retransmission states. The 18 states and the 14 states total 32 states. The 32 states need to be indicated using five bits. Of course, the preceding number of bits may be flexibly set and is not limited to the values in the preceding examples.

Embodiment Five

For ease of understanding, based on the preceding embodiment, this embodiment is described below by using an example of implementation of another process scheduling indication information.

In one example of this embodiment, the downlink control information further includes a method indication field and NDI information, or the process scheduling indication information includes a process indication field, or the downlink control information further includes NDI information, Before the downlink control information is acquired, the method further includes acquiring radio resource control (RRC) information, where the RRC information includes a method indication field; and the process scheduling indication information includes a process indication field.

The method indication field is used for indicating whether current process scheduling is performed in a hybrid transmission mode or a non-hybrid transmission mode.

The hybrid transmission mode means that in the case of scheduling multiple processes, the multiple processes correspond to the same or different NDI information values. The non-hybrid transmission means that in the case of scheduling multiple processes, the multiple processes correspond to the same NDI information value.

For example, in the case where the method indication field indicates the non-hybrid transmission mode, the NDI information is used for indicating whether all currently scheduled processes are newly transmitted or retransmitted, and the process indication field is used for indicating a currently scheduled process index.

In the case where the method indication field indicates the hybrid transmission mode, the NDI information and the process indication field are used for joint indication. Alternatively, in the case where the method indication field indicates the hybrid transmission mode, the total number of newly transmitted processes among the scheduled processes and retransmitted processes among the scheduled processes is the maximum number of the scheduled processes. Alternatively, in the case where the method indication field indicates the hybrid transmission mode, the number of newly transmitted processes among scheduled processes is at least one of one or two. Alternatively, in the case where the method indication field indicates the hybrid transmission mode, a determined mapping or offset relationship exists between a newly transmitted process index among scheduled processes and a retransmitted process index among the scheduled processes. Alternatively, in the case where the method indication field indicates the hybrid transmission mode, a newly transmitted process index among scheduled processes is the minimum or maximum index other than a retransmitted process index among the scheduled processes.

In this embodiment, the number of bits occupied by the method indication field may be flexibly determined. For example, the number of bits occupied by the method indication field may be one. In this case, it is feasible that the value bit 0 indicates non-hybrid transmission and the value bit 1 indicates hybrid transmission; or the value bit 1 indicates non-hybrid transmission and the value bit 0 indicates hybrid transmission.

The bit value of the NDI information is used for indicating whether a scheduled process is in a new-transmission state or a retransmission state. It is to be understood that the number of bits occupied by the NDI information in this embodiment may also be flexibly determined. For example, the number of bits occupied by the NDI information may be one. In this case, it is feasible that the value bit 0 indicates retransmission and the value bit 1 indicates new transmission; or the value bit 1 indicates retransmission and the value bit 0 indicates new transmission.

The process indication field is used for indicating a currently scheduled target process.

For example, in one example, if the bit value of the method indication field indicates a non-hybrid-transmission state and the bit value of the NDI information indicates a retransmission state, a corresponding target process is scheduled according to the process indication field so that a TB is retransmitted; if the bit value of the method indication field indicates a non-hybrid-transmission state and the bit value of the NDI information indicates a new-transmission state, a corresponding target process is scheduled according to the process indication field so that a TB is newly transmitted; if the bit value of the method indication field indicates a hybrid-transmission state and the bit value of the NDI information indicates a new-transmission state, a corresponding target process is scheduled according to the process indication field so that a TB is newly transmitted; and if the bit value of the method indication field indicates a hybrid-transmission state and the bit value of the NDI information indicates a retransmission state, then after a corresponding target process is scheduled according to the process indication field so that a TB is retransmitted, processes not scheduled currently are scheduled so that TBs are newly transmitted, that is, scheduling is performed according to the principle that as many as possible TBs are transmitted for hybrid transmission.

For example, in another example of this embodiment, if the bit value of the method indication field indicates a non-hybrid-transmission state and the bit value of the NDI information indicates a retransmission state, a corresponding target process is scheduled according to the process indication field so that a TB is retransmitted; if the bit value of the method indication field indicates a non-hybrid-transmission state and the bit value of the NDI information indicates a new-transmission state, a corresponding target process is scheduled according to the process indication field so that a TB is newly transmitted; if the bit value of the method indication field indicates a hybrid-transmission state and the bit value of the NDI information indicates a new-transmission state, a corresponding target process is scheduled according to the process indication field so that a TB is newly transmitted; and if the bit value of the method indication field indicates a hybrid-transmission state and the bit value of the NDI information indicates a retransmission state, then after a corresponding target process is scheduled according to the process indication field so that a TB is retransmitted, one of processes not scheduled currently is scheduled so that one TB is newly transmitted, where the scheduled process is a process not scheduled currently and shifted to after offset is performed sequentially in the direction from a target process whose process number is the smallest among the scheduled target processes to a target process whose process number is the largest among the scheduled target processes. That is, scheduling is performed according to the principle that one newly transmitted TB is scheduled for the hybrid transmission.

It is to be understood that in this embodiment, the process indication field may use the bitmap mode to perform indication, and the number of bits of the bitmap mode is equal to the number of processes to be scheduled; or the process indication field occupies multiple bits.

For ease of understanding, this embodiment is described by using an example of multi-TB scheduling in the case of multi-scheduling enhancement. The purpose is to implement multi-TB scheduling at a relatively small signaling overhead so that the transmission efficiency is improved and to enable newly transmitted TBs and retransmitted TBs to be scheduled within one piece of DCI.

In this example, the method indication field occupies one bit for indicating whether a state is a hybrid-transmission state or a non-hybrid-transmission state, the NDI information occupies one bit for NDI indication, and X bits are used for process scheduling indication (that is, process indication field).

When the bit value of the method indication field is 0, the method indication field indicates non-hybrid transmission, and the NDI indicates whether a TB process scheduling state is retransmission or new transmission. When the bit value of the method indication field is 1, the method indication field indicates hybrid transmission. If the NDI indicates that new transmission is performed currently, no hybrid-transmission state is included. If the NDI indicates that retransmission is performed currently, a hybrid-transmission state is indicated. The preceding may also be expressed as follows: When the bit value of the method indication field is 0, the method indication field indicates non-hybrid scheduling, all scheduled processes have the same NDI value, one bit indicates the value of the NDI, and X bits are used for process scheduling indication; when the bit value of the method indication field is 1, the method indication field indicates hybrid scheduling, and X+1 bits indicate states supported for the hybrid transmission.

For example, the example modes below or other modes may be used.

Mode one: Process bitmap (that is, process indication field)+one-bit NDI+one-bit method indication field. A maximum number of TBs are scheduled for the hybrid transmission.

For example, when four processes are to be scheduled, if bitmap is used for indicating process scheduling, the first bit corresponds to process 0, and so on. If the bit value of a state is 0001 and the bit value of the method indication field is 0, non-hybrid transmission is indicated. In this case, if the NDI indicates new transmission, one new TB of process 0 is scheduled; and if the NDI indicates retransmission, one retransmitted TB of process 0 is scheduled. If the bit value of the method indication field is 1, hybrid transmission is indicated. In this case, if the NDI indicates new transmission, one new TB of process 1 is scheduled; and if the NDI indicates retransmission, one retransmitted TB of process 0 is scheduled, and three new TBs of processes 1, 2 and 3 are scheduled. Other numbers of processes are processed similarly. Additionally, in this example, when the method indication field indicates non-hybrid transmission, only state 0000 is idle in the bitmap mode; and the method indication field and the NDI information occupy a total of two bits and indicate two idle states.

When the method indication field indicates hybrid transmission, the NDI information indicates new-transmission scheduling, state 0000 is idle, and there is one idle state.

When the method indication field indicates hybrid transmission, the NDI information indicates retransmission scheduling, state 0000 is idle, and there is one idle state. The remaining states have the following meanings: a, b, c, and d belong to {0, 1}, indicating scheduling of processes 0, 1, 2 and 3. 1 indicates retransmission scheduling. 0 indicates a newly transmitted TB of a corresponding process. For example, 1010 indicates scheduling of retransmitted TBs of processes 0 and 2 and indicates scheduling of newly transmitted TBs of processes 1 and 3 for the hybrid transmission. In the case where the four TBs are all retransmitted for the hybrid transmission, no new TB can be scheduled, and there is one idle state. Thus, a total of five states remain. The five states may be reserved or may be used for indicating other states.

Mode two: Process bitmap+one-bit NDI+one-bit method indication field. For the hybrid transmission, one newly transmitted TB is scheduled, and rightward cyclic offset of process numbers is performed in ascending order 0→1→2→3→0.

If the bit value of a state is 0101 and the bit value of the method indication field is 0, non-hybrid transmission is indicated. In this case, if the NDI indicates new transmission, one new TB of process 1 and one new TB of process 2 are scheduled; and if the NDI indicates retransmission, one retransmitted TB of process 1 and one retransmitted TB of process 2 are scheduled. If the bit value of the method indication field is 1, hybrid transmission is indicated. In this case, if the NDI indicates new transmission, one new TB of process 0 and one new TB of process 2 are scheduled; and if the NDI indicates retransmission, one retransmitted TB of process 0 and one retransmitted TB of process 2 are scheduled, and one new TB of process 1 is scheduled. The process 0 is a process which is used for retransmitting the TB and has a relatively small process number, the process 1 is shifted to by shifting the process number 0 to the right by one, and the process 1 is not used for retransmitting TB so that the process 1 can be used for scheduling a newly transmitted TB.

Mode three: Three-bit four-process scheduling (that is, process indication field)+one-bit NDI+one-bit method indication field. In this mode, a maximum number of TBs may also be scheduled for the hybrid transmission.

For example, when three bits indicate four scheduled processes, there are eight states. The one-bit NDI is used for indicating whether a scheduled process is newly transmitted or retransmitted.

The one-bit method indication field indicates whether the transmission is non-hybrid transmission or hybrid transmission currently. When the bit value of the method indication field is 0, the method indication field indicates non-hybrid transmission that includes at least one of the following states: processes 0, 1, 2 and 3; processes 0 and 1; processes 2 and 3; processes 0, 1 and 2; process 0; process 1; process 2; or process 3. The NDI indicates whether the transmission is new transmission or retransmission.

When the bit value of the method indication field is 1, the method indication field indicates hybrid transmission. In this case, if the NDI indicates new transmission, no retransmission is performed and no new TB is increased; and if the NDI indicates retransmission, multiple TBs of a maximum number of processes are scheduled. For example, when retransmission of processes 0, 1 is indicated and the method indication field indicates hybrid transmission, two processes and three processes are increased and two new TBs are scheduled.

In this example, in the case of hybrid transmission, an idle state during retransmission of four processes is reserved or used for other scheduling.

Mode four: X-bit eight-process scheduling (that is, process indication field)+one-bit NDI+one-bit method indication field. This procedure is similar to the preceding mode. The details are not described here.

Embodiment Six

For ease of understanding, based on the preceding embodiment, this embodiment is described below by using an example of implementation of another process scheduling indication information.

In this embodiment, downlink control information further includes M-bit NDI information.

The currently scheduled N processes are divided into M scheduled process groups. One bit corresponds to NDI information of one scheduled process group.

For example, when M is 2, the currently scheduled N processes are divided into two scheduled process groups. One bit corresponds to NDI information of one scheduled process group. In this case, the scheduling states include, but are not limited to, at least one of the cases below.

When 10 processes are scheduled, a first scheduled process group includes five processes, and a second scheduled process group includes five processes.

When nine processes are scheduled, a first scheduled process group includes five processes, and a second scheduled process group includes four processes.

When eight processes are scheduled, a first scheduled process group includes four processes, and a second scheduled process group includes four processes.

When seven processes are scheduled, a first scheduled process group includes four processes, and a second scheduled process group includes three processes.

When six processes are scheduled, a first scheduled process group includes three processes, and a second scheduled process group includes three processes.

When five processes are scheduled, a first scheduled process group includes three processes, and a second scheduled process group includes two processes.

When four processes are scheduled, a first scheduled process group includes two processes, and a second scheduled process group includes two processes.

When three processes are scheduled, a first scheduled process group includes two processes, and a second scheduled process group includes one process.

When two processes are scheduled, a first scheduled process group includes one process, and a second scheduled process group includes one process.

When one process is scheduled, a first scheduled process group includes one process, and a second scheduled process group includes zero processes.

It is to be understood that in this embodiment, a scheduled process group may include the same or different numbers of processes, and the values of M may also be 3, 4 or 5. The numbers and values may be flexibly set according to requirements. Moreover, the case of grouping according to scheduled processes may be flexibly set and is not limited to the preceding example settings. The details are not described here. Furthermore, in this embodiment, the indication mode of scheduled processes may include, but is not limited to, the modes described in the preceding embodiments.

Embodiment Seven

Based on the preceding embodiments, in this embodiment, in a multi-TB scheduling scenario in the case of multi-scheduling enhancement, TBS indication is compressed so that the DCI overhead is reduced. Table 8 describes a TBS indication mode in a related standard. In Table 8, parameters $I_{SF}$ and $I_{TBS}$ are determined by the DCI content.

TABLE 8

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |
| 13 | 224 | 488 | 744 | 1032 | 1256 | 1544 | 2024 | 2536 |

In this embodiment, in the case of multi-TB scheduling, single-TB scheduling is performed for a small amount of data, and multi-TB scheduling is performed for a large amount of data so that PDCCH resources are saved and the transmission efficiency is improved. The amount of data is the main factor that determines whether single-TB scheduling or multi-TB scheduling is performed.

In the case where multi-TB scheduling is enabled, the amount of data is greater than X bits. TBS values less than X/N may be removed from the preceding table. States greater than or equal to X/N bits and states closest to X/N bits are retained in the preceding table. N denotes the supported number of processes.

When the value of X is 2536 and N=2, 2536/2=1268 bits. In this case, at least states in Table 9 are included, and the DCI uses four bits to perform indication.

TABLE 9

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | | | | | | | | |
| 1 | | | | | | | | |
| 2 | | | | | | | | |
| 3 | | | | | | | | |
| 4 | | | | | | | | |
| 5 | | | | | | | | |
| 6 | | | | | | | | |
| 7 | | | | | | | | |
| 8 | | | | | | | | | 1352 |
| 9 | | | | | | | 1256 | 1544 |
| 10 | | | | | | | 1384 | 1736 |
| 11 | | | | | | | 1608 | 2024 |
| 12 | | | | | | 1352 | 1800 | 2280 |
| 13 | | | | | 1256 | 1544 | 2024 | 2536 |

Optionally, the resource allocation field and the modulation and coding scheme (MCS) field may jointly perform indication. When four bits are used for indication, there are 16 states. Each of the 14 pieces of data in the preceding table corresponds to one state. The remaining two states are reserved and idle or used for other TBS indication.

Embodiment Eight

Based on the preceding embodiments, in this embodiment, in a multi-TB scheduling scenario in the case of multi-scheduling enhancement, the number of repetitions of the multiple TBs is indicated.

In this embodiment, when TBs scheduled through one DCI are all retransmitted or newly transmitted, the number of repetitions is a common parameter of the multiple TBs. In this embodiment, when among TBs scheduled through one DCI, some are retransmitted and some are newly transmitted, the number of repetitions may be a common parameter of the multiple TBs, or the new transmission and the retransmission may be indicated differently.

When the new transmission and the retransmission are indicated differently, the two example modes below or other modes may be used.

In mode one, the DCI overhead is not increased, and a fixed mapping mode is used.

For example, assuming that the number of repetitions of the retransmitted TBs is R1 last time and R this time. In this case, the number of repetitions of the newly transmitted TBs is R2, and the mapping mode is R=(R1+R2)/4, or R=R1/2, or R=R2/2.

In mode two, the overhead is increased by K bits, and indication and mapping are both used. K≤2.

For example, when K=1 bit, the bit value 0 (or 1) of the indication field indicates that the number of repetitions of the retransmitted TBs is the same as the number of repetitions of the newly transmitted TBs; and the bit value 1 (or 0) of the indication field indicates that the number of repetitions of the retransmitted TBs is obtained in a mapping mode or an offset mode.

The mapping mode includes a linear relationship similar to that described above or includes other correspondences. The offset mode includes that offset is performed based on the number of repetitions of the newly transmitted TBs so that the number of repetitions of the retransmitted TBs is obtained.

Additionally, in the case of multi-TB scheduling, no matter in hybrid transmission or non-hybrid transmission, both the resource allocation field and the MCS can be uniformly indicated for TBs scheduled by a DCI.

Embodiment Nine

Based on the preceding embodiments, in this embodiment, in a multi-TB scheduling scenario in the case of multi-scheduling enhancement, one process corresponds to multiple TBs so that the gain is obtained from multi-TB scheduling at a relatively low code rate.

For example, when the number of processes is two and one process corresponds to two TBs, a maximum of four TBs are scheduled and a minimum of one TB is scheduled. In this case, a four-TB scheduling scheme may be used. If the feedback mode is a TB-specific mode, that is, each TB has one-bit feedback information, or if the feedback mode is an all-TB bundling mode, the four scheduled TBs are numbered 0, 1, 2 and 3; and TB 0 and TB 1 are scheduled in one process while TB 2 and TB 3 are scheduled in another process. Other schemes are similar to this. One example is described in Table 10.

TABLE 10

| One state | Four scheduled TBs | TBs 0, 1, 2 and 3 |
|---|---|---|
| Two states | Two scheduled TBs | TBs 0 and 1 and TBs 2 and 3 |
| One state | Three scheduled TBs | TBs 0, 1 and 2 (or TBs 1, 2 and 3; TBs 0, 1 and 3; or TBs 0, 2 and 3) |
| Four states | Single scheduled TB | TB 0, TB 1, TB 2 and TB 3 |

If the feedback mode is a single-process two-TB bundling mode, the group bitmap+intragroup bitmap mode is used, and two TBs corresponding to one process form one group. The indication is performed using a total of four bits.

Embodiment Ten

Figure 2:
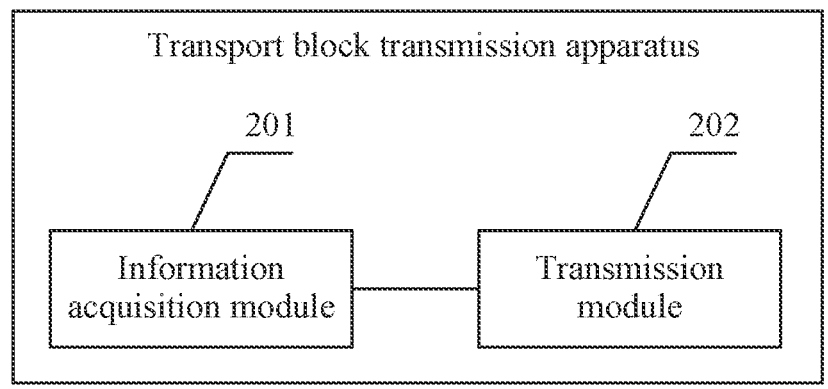
FIG. 2 is a diagram illustrating the structure of a transport block transmission apparatus according to embodiment ten of the present application.

This embodiment provides a transport block (TB) transmission apparatus applicable to various communication devices. As shown in FIG. 2, the apparatus includes an information acquisition module 201 and a transmission module 202.

The information acquisition module 201 is configured to acquire downlink control information (DCI), where the downlink control information includes process scheduling indication information for indicating at least one scheduled process.

The transmission module 202 is configured to transmit, according to the process scheduling indication information, a transport block corresponding to each scheduled process.

In one example of this embodiment, the process scheduling indication information includes a first method field and a first state field.

The first method field is used for indicating whether the number of currently scheduled processes is even or odd. The first state field is used for indicating a scheduled process index.

Alternatively, the first method field is used for indicating an indication mode of the first state field. The indication mode includes at least one of a bitmap mode or a predefined mode. In the bitmap mode, each bit corresponds to one process, or each bit corresponds to one process group. The predefined mode may be in the form of a table or in other forms. A mapping exists between the process scheduling information in the predefined mode and the process scheduling indication information in the DCI.

Alternatively, the first method field is used for indicating a mapping between a state of the first state field and a scheduled target process.

In this example, when the first method field is used for indicating the indication mode of the first state field and when the indication mode is the bitmap mode, the bitmap mode indicates that each bit corresponds to one process group that includes two or four processes; when the indication mode is the predefined mode, the predefined mode is used for indicating a single scheduled process and two scheduled processes, and scheduling states of the two processes are different from scheduling states of two processes indicated by the bitmap mode; or the predefined mode is used for indicating scheduling states of one process, three processes, five processes and seven processes. The single scheduled process indicates one scheduled target process. The two scheduled processes indicate two scheduled target processes.

In one example of this embodiment, the number of scheduled processes includes one, two, eight, and all process combinations of the one process, the two processes and the eight processes.

In one example of this embodiment, the process scheduling indication information includes a group bitmap field and an intragroup bitmap field. The group bitmap field is used for indicating a currently scheduled target process group. The intragroup bitmap field is used for indicating a scheduled target process in the target process group.

In one example of this embodiment, the maximum number of scheduled processes is four; and the process scheduling indication information includes a three-bit scheduling indication field; and among eight states of the scheduling indication field, one state is used for indicating four scheduled processes, two states are each used for indicating a combination of two scheduled processes, one state is used for indicating a combination of three scheduled processes, and four states are used for indicating four different scheduled single processes.

Alternatively, among eight states of the scheduling indication field, one state is used for indicating four scheduled processes, three states are each used for indicating a combination of two scheduled processes, and four states are used for indicating four different scheduled single processes.

In one example of this embodiment, the maximum number of scheduled processes is eight; and the process scheduling indication information includes a seven-bit scheduling indication field; and among 128 states of the scheduling indication field, at least one of the cases below applies.

Eight states are used for indicating eight different scheduled single processes, 28 states are each used for indicating a combination of two scheduled processes, 56 states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, and one state is used for indicating a combination of eight scheduled processes, or a remaining state is reserved or is used for indicating at least one of a combination of four scheduled processes, a combination of five scheduled processes, a combination of six scheduled processes or a combination of seven scheduled processes.

Alternatively, the process scheduling indication information includes a six-bit scheduling indication field; and among 64 states of the scheduling indication field, at least one of the cases below applies.

Eight states are used for indicating eight different scheduled single processes, 28 states are each used for indicating a combination of two scheduled processes, 23 states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, or one state is used for indicating a combination of eight scheduled processes. In this embodiment, a combination of X processes refers to a combination of X processes scheduled.

Alternatively, the process scheduling indication information includes a five-bit scheduling indication field; and among 32 states of the scheduling indication field, at least one of the cases below applies.

Eight states are used for indicating eight different scheduled single processes, 16 states are each used for indicating a combination of two scheduled processes, three states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, or one state is used for indicating a combination of eight scheduled processes.

In one example of this embodiment, the maximum number of scheduled processes is four, the downlink control information further includes new data indication (NDI) information, and the process scheduling indication information and the NDI information form a joint indication field; and the joint indication field includes six bits; and among 64 states of the joint indication field, at least one of the cases below applies.

15 states are used for indicating 15 scheduled process combinations when four processes are newly transmitted, 15 states are used for indicating 15 scheduled process combinations when the four processes are retransmitted, 28 states are used for indicating 28 scheduled process combinations when one of the four processes is retransmitted, or six states are used for indicating six scheduled process combinations when two of the four processes are retransmitted and two of the four processes are newly transmitted.

Alternatively, the joint indication field occupies five bits; and among 32 states of the joint indication field, at least one of the cases below applies.

Seven states are used for indicating seven scheduled process combinations when four processes are newly transmitted, seven states are used for indicating seven scheduled process combinations when the four processes are retransmitted, 16 states are used for indicating 16 scheduled process combinations when one of the four processes is retransmitted, or two states are used for indicating two scheduled process combinations when two of the four processes are retransmitted and two of the four processes are newly transmitted.

In one example of this embodiment, the downlink control information further includes a method indication field and NDI information; or the downlink control information further includes NDI information, and before the downlink control information is acquired, the method further includes acquiring radio resource control (RRC) information, where the RRC information includes a method indication field; and the process scheduling indication information includes a process indication field.

The method indication field is used for indicating whether current process scheduling is performed in a hybrid transmission mode or a non-hybrid transmission mode.

The hybrid transmission mode means that in the case of scheduling multiple processes, the multiple processes correspond to the same or different NDI information values. The non-hybrid transmission means that in the case of scheduling multiple processes, the multiple processes correspond to the same NDI information value.

In one example of this embodiment, in the case where the method indication field indicates the non-hybrid transmission mode, the NDI information is used for indicating whether all currently scheduled processes are newly transmitted or retransmitted, and the process indication field is used for indicating a currently scheduled process index; and in the case where the method indication field indicates the hybrid transmission mode, the NDI information and the process indication field are used for joint indication.

Alternatively, in the case where the method indication field indicates the hybrid transmission mode, the total number of newly transmitted processes among scheduled processes and retransmitted processes among the scheduled processes is the maximum number of the scheduled processes.

Alternatively, in the case where the method indication field indicates the hybrid transmission mode, the number of newly transmitted processes among scheduled processes is at least one of one or two.

Alternatively, in the case where the method indication field indicates the hybrid transmission mode, a determined mapping or offset relationship exists between a newly transmitted process index among scheduled processes and a retransmitted process index among the scheduled processes.

In one example of this embodiment, the downlink control information further includes M-bit NDI information. Currently scheduled processes are divided into M scheduled process groups. One bit corresponds to NDI information of one scheduled process group.

The transport block transmission apparatus enables flexible scheduling of one or more (at least two) TBs, better satisfying various communication requirements.

Embodiment Eleven

Figure 3:
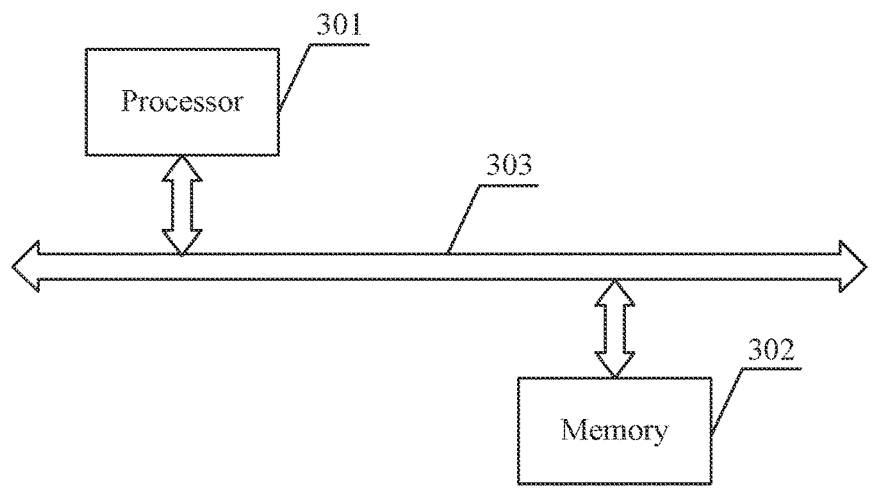
FIG. 3 is a diagram illustrating the structure of a communication device according to embodiment eleven of the present application.

This embodiment provides a communication device that may be a user device such as a user communication terminal or may be a network communication device such as a base station device. As shown in FIG. 3, the communication device includes a processor 301, a memory 302 and a communication bus 303.

The communication bus 303 is configured to enable communicative connection between the processor 301 and the memory 302.

In one example, the processor 301 may be configured to execute at least one computer program stored in the memory 302 to perform the steps of the transport block transmission method of any preceding embodiment.

Figure 5:
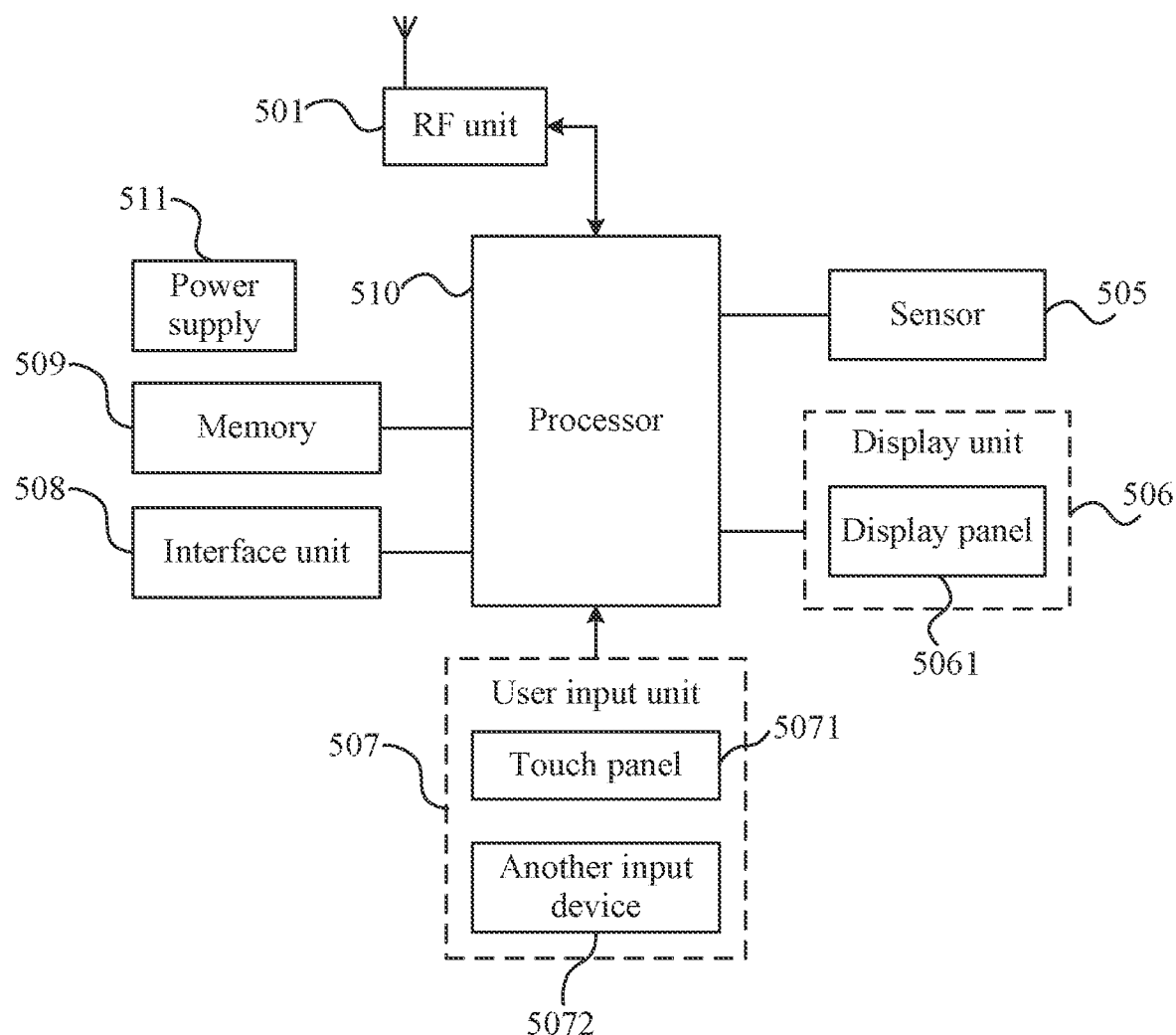
FIG. 5 is a diagram illustrating the structure of a communication terminal according to embodiment eleven of the present application.

For ease of understanding, a description is given in one example of this embodiment by using a base station as the communication device. It is to be understood that the base station of this embodiment may be a cabinet macro base station, a distributed base station or a multi-mode base station. Referring to FIG. 5, the base station of this example includes a baseband unit (BBU) 41, a radio remote unit (RRU) 42 and an antenna 43.

Figure 4:
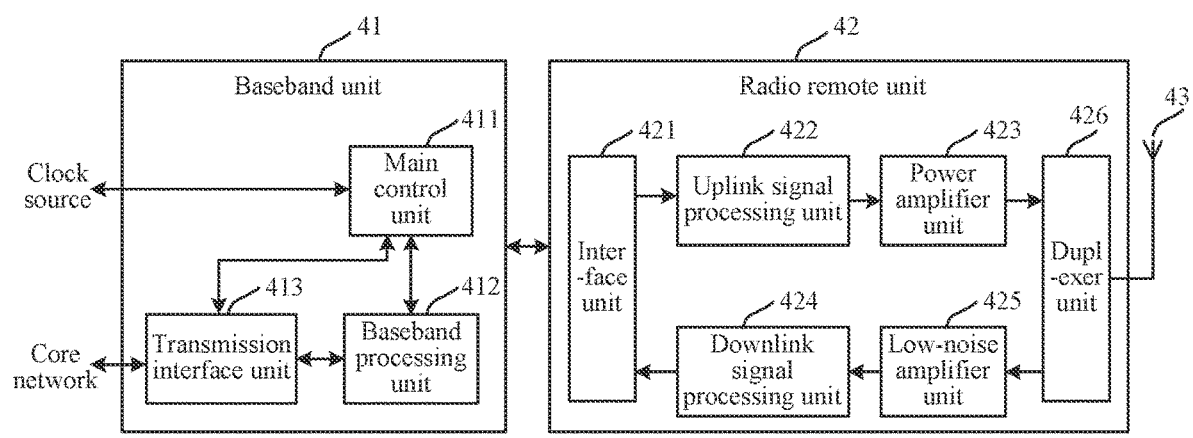
FIG. 4 is a diagram illustrating the structure of a base station according to embodiment eleven of the present application.

The baseband unit 41 is configured to perform centralized control and management of the base station system and uplink and downlink baseband processing and provide physical interfaces for information interaction with the radio remote unit and a transport network. According to different logic functions, as shown in FIG. 4, the baseband unit 41 may include a baseband processing unit 412, a main control unit 411 and a transmission interface unit 413. The main control unit 411 is configured to provide functions such as control and management of the baseband unit, signaling processing, data transmission, interaction control and system clock. The baseband processing unit 412 is configured to perform baseband protocol processing such as signal coding and modulation, resource scheduling and data encapsulation and provide an interface between the baseband unit and the radio remote unit. The transmission interface unit 413 is configured to provide a transmission interface connected to the core network. In this example, the preceding logical function units may be distributed on different physical boards or may be integrated on the same board. Optionally, the baseband unit 41 may be a structure in which the baseband processing unit is integrated with the main control unit or a structure in which the baseband processing unit is separated from the main control unit. In the structure in which the baseband processing unit is integrated with the main control unit, the baseband processing unit, the main control unit and the transmission interface unit are integrated on the same physical board. This structure has a higher reliability, a lower delay, a higher resource sharing and scheduling efficiency, and a lower power consumption. In the structure in which the baseband processing unit is separated from the main control unit, the baseband processing unit and the main control unit are distributed on different boards. The baseband processing unit is mounted on a baseband board. The main control unit is mounted on a main control board. This structure allows free combination between boards, facilitating flexible expansion of the baseband. In practical application, the arrangement depends on requirements.

The radio remote unit 42 is configured to communicate with the BBU through a baseband-RF interface to complete conversion between a baseband signal and a radio frequency signal. Referring to FIG. 4, an exemplary radio remote unit 42 includes an interface unit 421, a downlink signal processing unit 424, an uplink signal processing unit 422, a power amplifier unit 423, a low-noise amplifier unit 425 and a duplexer unit 426. These units constitute a downlink signal processing link and an uplink signal processing link. The interface unit 421 is configured to provide a forward interface with the baseband unit and receive and send a baseband IQ signal. The downlink signal processing unit 424 is configured to perform signal processing functions such as signal up-conversion, digital-to-analog conversion and radio frequency modulation. The uplink signal processing unit 422 is configured to perform functions such as signal filtering, mixing, analog-to-digital conversion and down-conversion. The power amplifier unit 423 is configured to amplify a downlink signal and then send the downlink signal through the antenna 43 to, for example, a terminal. The low-noise amplifier unit 424 is configured to amplify the downlink signal received by the antenna 43 and then send the amplified downlink signal to the downlink signal processing unit 424 so as to be processed. The duplexer unit 426 supports multiplexing and filtering of received and sent signals.

Additionally, it is to be understood that the base station of this embodiment may also use a CU-DU architecture. The DU is a distributed access point responsible for underlying baseband protocol and radio frequency processing. The CU is a central unit responsible for higher-layer protocol processing and centralized management of DUs. The CU and the DU jointly perform baseband and radio frequency processing of the base station.

In this embodiment, the base station may further include a storage unit for storing various data. For example, the storage unit can store the at least one computer program. The main control unit or the central unit can be used as a processor to invoke the at least one computer program stored in the storage unit to perform the steps of the transport block transmission method of any preceding embodiment.

In this example, when the preceding transport block transmission apparatus is disposed in the base station, the functions of the information acquisition module and the transmission module of the transport block transmission apparatus can also be implemented by the main control unit or the central unit.

For ease of understanding, a description is given in another example of this embodiment by using a communication terminal as the communication device. Referring to FIG. 5, the communication terminal may be a mobile terminal having a communication function, for example, a mobile phone, a tablet computer, a notebook computer, a palmtop computer, a personal digital assistant (PDA), a navigation device, a wearable device or a smart band. The communication terminal may include a radio frequency (RF) unit 501, a sensor 505, a display unit 506, a user input unit 507, an interface unit 508, a memory 509, a processor 510 and a power supply 511. It is to be understood by those skilled in the art that the communication terminal is not limited to the structure of the communication terminal shown in FIG. 5. The communication terminal may include more or fewer components than the components illustrated, may include a combination of some of the components illustrated or may include components arranged in a different manner than the components illustrated.

The radio frequency unit 501 can be used for communication, that is, receiving and sending signals. For example, the radio frequency unit 501 can receive downlink information from the base station and then send the received downlink information to the processor 510 so that the received downlink information can be processed by the processor 510. Moreover, the radio frequency unit 501 can send uplink data to the base station. Generally, the radio frequency unit 501 includes, but is not limited to, an antenna, at least one amplifier, a transceiver, a coupler, a low-noise amplifier and a duplexer. Moreover, the radio frequency unit 501 can communicate with a network and other devices by way of wireless communication. The sensor 505 may be, for example, alight sensor or a motion sensor. The light sensor may be, for example, an ambient light sensor or a proximity sensor. The ambient light sensor can adjust the brightness of a display panel 5061 according to the brightness of the ambient light.

The display unit 506 is configured to display information input by or provided for a user. The display unit 106 may include a display panel 6061, for example, an organic light-emitting diode (OLED) display panel or an active-matrix organic light-emitting diode (AMOLED) display panel.

The user input unit 507 may be configured to receive input digital or character information and generate key signal input related to user settings and function control of the mobile terminal. The user input unit 507 may include a touch panel 5071 and another input device 5072.

The interface unit 508 serves as an interface through which at least one external device can be connected to the communication terminal. For example, the external device may include an external power supply (or battery charger) port, a wired or wireless data port, a memory card port, a port for connecting a device having an identification module, and an audio input/output (I/O) port.

The memory 509 can store software programs and various data. The memory 509 may include a high-speed random-access memory and may also include a non-volatile memory such as at least one disk memory, a flash memory device or another volatile solid-state memory.

As the control center of the communication terminal, the processor 510 is configured to connect various parts of the communication terminal by using various interfaces and lines and perform various functions and data processing of the communication terminal by executing software programs and/or modules stored in the memory 509 and invoking data stored in the memory 509.

For example, the processor 510 may be configured to invoke the at least one computer program stored in the memory 509 to perform the steps of the preceding transport block transmission method.

The processor 510 may include one or more processing units. Preferably, an application processor and a modem processor may be integrated into the processor 510. The application processor is configured to process an operating system, a user interface and an application program. The modem processor is configured to process wireless communication. It is to be understood that the modem processor may be not integrated into the processor 510.

Optionally, the power supply 511 (for example, a battery) can be logically connected to the processor 510 through a power management system to perform functions such as charging management, discharging management and power consumption management through the power management system.

In this example, when the preceding transport block transmission apparatus is disposed in the communication terminal, the functions of the information acquisition module and the transmission module of the transport block transmission apparatus can also be implemented by the processor 510.

This embodiment provides a computer-readable storage medium. The computer-readable storage medium includes a volatile or non-volatile medium or a removable or non-removable medium implemented in any method or technology for storing information (such as computer-readable instructions, data structures, computer program modules or other data). The computer-readable storage medium includes, but is not limited to, a random-access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic disk or another magnetic storage device, or any other medium that can be used for storing desired information and that can be accessed by a computer.

In one example, the computer-readable storage medium of this embodiment may be configured to store at least one computer program. The at least one computer program is executable by at least one processor and is configured to cause the at least one processor to perform the steps of the transport block transmission method of any preceding embodiment.

This embodiment provides a computer program (or computer software). The computer program may be distributed in a computer-readable medium and executed by a computing device to implement at least one step of the transport block transmission method of any preceding embodiment. Moreover, in some cases, the illustrated or described at least one step may be performed in a sequence different from the sequence described in any preceding embodiment.

This embodiment provides a computer program product. The computer program product includes a computer-readable apparatus that stores the preceding computer program. In this embodiment, the computer-readable apparatus may include the preceding computer-readable storage medium.

It can be seen that it is to be understood by those skilled in the art that some or all steps of the preceding method and function modules/units in the preceding system or apparatus may be implemented as software (which may be implemented by computer program codes executable by a computing device), firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits.

Additionally, as is known to those having ordinary skill in the art, communication media generally include computer-readable instructions, data structures, computer program modules, or other data in carriers or in modulated data signals transported in other transport mechanisms and may include any information delivery medium. Therefore, the present application is not limited to any particular combination of hardware and software.

The above is a more detailed description of embodiments of the present application in conjunction with implementations and is not to be construed as limiting embodiments of the present application. For those having ordinary skill in the art to which the present application pertains, simple deductions or substitutions may be made without departing from the concept of the present application and are considered to fall within the scope of the present application.

What is claimed is:

1. A transport block (TB) transmission method, comprising:
    acquiring downlink control information, wherein the downlink control information comprises process scheduling indication information for indicating one scheduled process or two scheduled processes, a maximum number of scheduled processes is eight, and the process scheduling indication information comprises all process combinations of one process or two processes from the eight scheduled processes, a process combination of one process refers to scheduling one process from the eight scheduled processes, and a process combination of two processes refers to scheduling two processes from the eight scheduled processes, a total number of process combinations of one process is 8, and a total number of process combinations of two processes is 28; and
    transmitting, according to the process scheduling indication information, a transport block corresponding to each process of the at least one scheduled process;
    the process scheduling indication information comprises a six-bit scheduling indication field; and
    among 64 states of the scheduling indication field, 28 states are each used for indicating a combination of two scheduled processes, and among the 28 states, each state is represented by a bit value and corresponds to a different process combination of two processes among the 28 process combinations of two processes.

2. The TB transmission method of claim 1, wherein the process scheduling indication information comprises a first method field and a first state field, wherein
    the first method field is used for indicating whether a number of currently scheduled processes is even or odd, and the first state field is used for indicating a scheduled process index; or
    the first method field is used for indicating an indication mode of the first state field; or
    the first method field is used for indicating a mapping between a state of the first state field and a scheduled target process.

3. The TB transmission method of claim 2, wherein in a case where the first method field is used for indicating the indication mode of the first state field, the indication mode comprises at least one of a bitmap mode or a predefined mode, wherein in the bitmap mode, each bit corresponds to one process, or each bit corresponds to one process group.

4. The TB transmission method of claim 3, wherein
    the indication mode is the bitmap mode, and the bitmap mode indicates that each bit corresponds to one process group that comprises two or four processes; or
    the indication mode is the predefined mode, a number of scheduled processes is one or two, and indexes of the two processes are different from indexes of two processes indicated by the bitmap mode.

5. The TB transmission method of claim 1, wherein when the number of the at least one scheduled process is eight, the process scheduling indication information comprises one state used for indicating a combination of eight processes.

6. The TB transmission method of claim 1, wherein the process scheduling indication information comprises a group bitmap field and an intragroup bitmap field, wherein
    the group bitmap field is used for indicating a currently scheduled target process group, and the intragroup bitmap field is used for indicating a scheduled target process in the target process group.

7. The TB transmission method of claim 1, wherein
    the process scheduling indication information comprises a seven-bit scheduling indication field; and among 128 states of the scheduling indication field, at least one of the following applies:
    eight states are used for indicating eight different scheduled single processes, 28 states are each used for indicating a combination of two scheduled processes, 56 states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, and one state is used for indicating a combination of eight scheduled processes, or a remaining state is reserved or is used for indicating at least one of a combination of four scheduled processes, a combination of five scheduled processes, a combination of six scheduled processes or a combination of seven scheduled processes; or in response to the process scheduling indication information comprises a six-bit scheduling indication field, among 64 states of the scheduling indication field, at least one of the following applies:

eight states are used for indicating eight different scheduled single processes, 23 states are each used for indicating a combination of three scheduled processes, one state is used for indicating a combination of four scheduled processes, one state is used for indicating a combination of five scheduled processes, one state is used for indicating a combination of six scheduled processes, one state is used for indicating a combination of seven scheduled processes, or one state is used for indicating a combination of eight scheduled processes.

8. The TB transmission method of claim 1, wherein a maximum number of scheduled processes is four, the downlink control information further comprises new data indication (NDI) information, and the process scheduling indication information and the NDI information form a joint indication field; and wherein the joint indication field occupies six bits; and among 64 states of the joint indication field, at least one of the following applies:

15 states are used for indicating 15 scheduled process combinations in a case where four processes are newly transmitted, 15 states are used for indicating 15 scheduled process combinations in a case where the four processes are retransmitted, 28 states are used for indicating 28 scheduled process combinations in a case where one of the four processes is retransmitted, or six states are used for indicating six scheduled process combinations in a case where two of the four processes are retransmitted and two of the four processes are newly transmitted.

9. The TB transmission method of claim 1, wherein the downlink control information further comprises a method indication field and NDI information, or the downlink control information further comprises NDI information; before the downlink control information is acquired, the method further comprises acquiring radio resource control (RRC) information, wherein the RRC information comprises a method indication field; and the process scheduling indication information comprises a process indication field, wherein the method indication field is used for indicating whether current process scheduling is performed in a hybrid transmission mode or a non-hybrid transmission mode, wherein the hybrid transmission mode means that in a case of scheduling a plurality of processes, the plurality of processes correspond to same or different NDI information values; and the non-hybrid transmission means that in a case of scheduling a plurality of processes, the plurality of processes correspond to a same NDI information value.

10. The TB transmission method of claim 9, wherein in a case where the method indication field indicates the non-hybrid transmission mode, the NDI information is used for indicating whether all currently scheduled processes are newly transmitted or retransmitted, and the process indication field is used for indicating a currently scheduled process index; or in a case where the method indication field indicates the hybrid transmission mode, the NDI information and the process indication field are used for joint indication; or in a case where the method indication field indicates the hybrid transmission mode, a total number of newly-transmitted processes among scheduled processes and retransmitted processes among the scheduled processes is a maximum number of the scheduled processes; or in a case where the method indication field indicates the hybrid transmission mode, a number of newly-transmitted processes among scheduled processes is at least one of one or two; or in a case where the method indication field indicates the hybrid transmission mode, a determined mapping or offset relationship exists between a newly-transmitted process index among scheduled processes and a retransmitted process index among the scheduled processes; or in a case where the method indication field indicates the hybrid transmission mode, a newly-transmitted process index among scheduled processes is a minimum or maximum index other than a retransmitted process index among the scheduled processes.

11. The TB transmission method of claim 1, wherein the downlink control information further comprises M-bit NDI information, wherein currently scheduled processes are divided into M scheduled process groups, and one bit corresponds to NDI information of one scheduled process group of the M scheduled process groups.

12. The TB transmission method of claim 11, wherein in a case where M is two, the currently scheduled processes are divided into two scheduled process groups, the one bit corresponds to NDI information of one scheduled process group of the two scheduled process groups, and a scheduling state comprises at least one of the following:

in a case where 10 processes are scheduled, a first scheduled process group comprises five processes, and a second scheduled process group comprises five processes;

in a case where nine processes are scheduled, a first scheduled process group comprises five processes, and a second scheduled process group comprises four processes;

in a case where eight processes are scheduled, a first scheduled process group comprises four processes, and a second scheduled process group comprises four processes;

in a case where seven processes are scheduled, a first scheduled process group comprises four processes, and a second scheduled process group comprises three processes;

in a case where six processes are scheduled, a first scheduled process group comprises three processes, and a second scheduled process group comprises three processes;

in a case where five processes are scheduled, a first scheduled process group comprises three processes, and a second scheduled process group comprises two processes;

in a case where four processes are scheduled, a first scheduled process group comprises two processes, and a second scheduled process group comprises two processes;

in a case where three processes are scheduled, a first scheduled process group comprises two processes, and a second scheduled process group comprises one process;

in a case where two processes are scheduled, a first scheduled process group comprises one process, and a second scheduled process group comprises one process; or in a case where one process is scheduled, a first scheduled process group comprises one process, and a second scheduled process group comprises zero processes.

13. A communication device, comprising a processor, a memory and a communication bus, wherein the communication bus is configured to connect the processor and the memory; and the processor is configured to execute a computer program stored in the memory to perform the following steps:

acquiring downlink control information, wherein the downlink control information comprises process scheduling indication information for indicating one scheduled process or two scheduled processes, a maximum number of scheduled processes is eight, and the process scheduling indication information comprises all process combinations of one process or two processes from the eight scheduled processes, a process combination of one process refers to scheduling one process from the eight scheduled processes, and a process combination of two processes refers to scheduling two processes from the eight scheduled processes, a total number of process combinations of one process is 8, and a total number of process combinations of two processes is 28; and transmitting, according to the process scheduling indication information, a transport block corresponding to each process of the at least one scheduled process;

the process scheduling indication information comprises a six-bit scheduling indication field; and among 64 states of the scheduling indication field, 28 states are each used for indicating a combination of two scheduled processes, and among the 28 states, each state is represented by a bit value and corresponds to a different process combination of two processes among the 28 process combinations of two processes.

14. A non-transitory computer-readable storage medium, the storage medium storing at least one computer program, wherein the at least one computer program is executable by at least one processor and is configured to cause the at least one processor to perform the following steps:

acquiring downlink control information, wherein the downlink control information comprises process scheduling indication information for indicating one scheduled process or two scheduled processes, a maximum number of scheduled processes is eight, and the process scheduling indication information comprises all process combinations of one process or two processes from the eight scheduled processes, a process combination of one process refers to scheduling one process from the eight scheduled processes, and a process combination of two processes refers to scheduling two processes from the eight scheduled processes, a total number of process combinations of one process is 8, and a total number of process combinations of two processes is 28; and transmitting, according to the process scheduling indication information, a transport block corresponding to each process of the at least one scheduled process;

the process scheduling indication information comprises a six-bit scheduling indication field; and among 64 states of the scheduling indication field, 28 states are each used for indicating a combination of two scheduled processes, and among the 28 states, each state is represented by a bit value and corresponds to a different process combination of two processes among the 28 process combinations of two processes.

15. The communication device of claim 13, wherein the process scheduling indication information comprises a first method field and a first state field, wherein the first method field is used for indicating whether a number of currently scheduled processes is even or odd, and the first state field is used for indicating a scheduled process index; or the first method field is used for indicating an indication mode of the first state field; or the first method field is used for indicating a mapping between a state of the first state field and a scheduled target process.

16. The communication device of claim 15, wherein in a case where the first method field is used for indicating the indication mode of the first state field, the indication mode comprises at least one of a bitmap mode or a predefined mode, wherein in the bitmap mode, each bit corresponds to one process, or each bit corresponds to one process group.

17. The communication device of claim 16, wherein the indication mode is the bitmap mode, and the bitmap mode indicates that each bit corresponds to one process group that comprises two or four processes; or the indication mode is the predefined mode, a number of scheduled processes is one or two, and indexes of the two processes are different from indexes of two processes indicated by the bitmap mode.

18. The communication device of claim 13, wherein when the number of scheduled processes is eight, the process scheduling indication information comprises all states each used for indicating a combination of eight processes.

19. The communication device of claim 13, wherein the process scheduling indication information comprises a group bitmap field and an intragroup bitmap field, wherein the group bitmap field is used for indicating a currently scheduled target process group, and the intragroup bitmap field is used for indicating a scheduled target process in the target process group.

* * * * *